Jan. 21, 1936. J. McDOWELL ET AL 2,028,555
SPRINKLING ATTACHMENT FOR HOSE
Filed Dec. 29, 1934
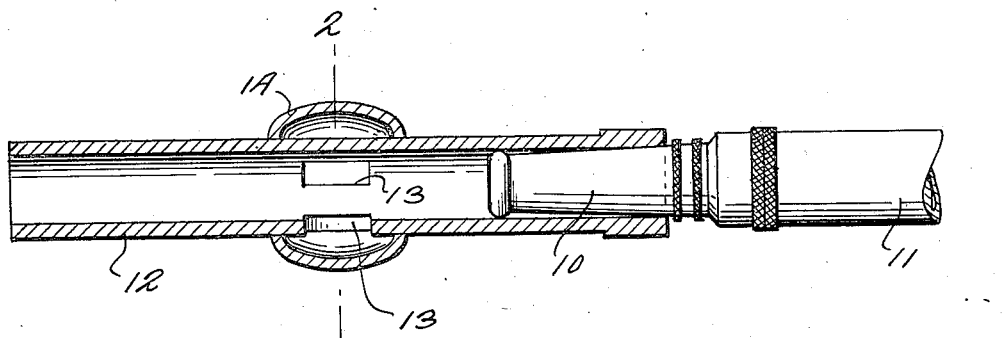
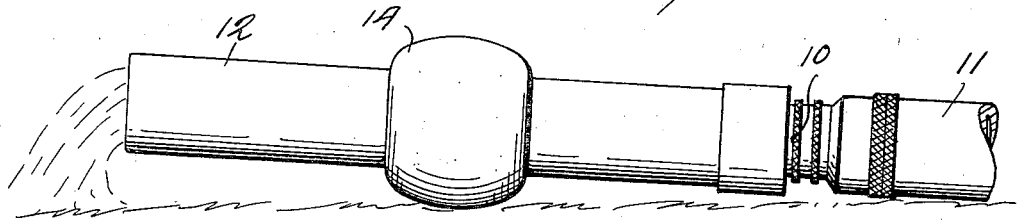
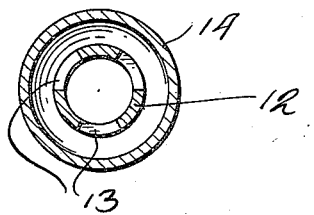

Patented Jan. 21, 1936

2,028,555

UNITED STATES PATENT OFFICE 2,028,555

SPRINKLING ATTACHMENT FOR HOSE

John McDowell, James F. McDowell, and Earl McDowell, Palisade, Colo., assignors of seven and one-half per cent to Charles W. Tharp, five per cent to Oscar Thompson, two and one-half per cent to Jack Naeve, two and one-half per cent to Victor L. Leeper, three per cent to Tom Matthews, two per cent to Jake W. Ward, and five per cent to Nels B. Granat Application December 29, 1934, Serial No. 759,748

3 Claims. (Cl. 299—107)

This invention relates to sprinkling devices and more particularly to an attachment for a hose such as is commonly used for watering lawns or the like so as to eliminate the spray from the nozzle of the hose for the purpose of permitting the water to flow onto the ground, either the grass or in the flower beds without washing or digging holes during the sprinkling or watering of the ground.

Another object of this invention is to provide an attachment of this kind which can be readily slipped onto the nozzle of a hose so as to permit the free flowing of the water from the hose without having the water under sufficient pressure to cause damage to the ground.

A further object of this invention is to provide a device of this type which is adapted for use with various types of nozzles and hose constructions so that in localities where local conditions prevent watering of grass or flower beds without taking off the nozzle, the water may flow gently on the plants or ground without cutting any holes in the ground or injuring the plants by reason of excessive spray.

The above and various other objects and advantages of this invention will in part be described and in part be understood from the following detailed description of the present preferred embodiment, the same being illustrated in the accompanying drawing wherein:—

Figure 1 is a longitudinal section partly in detail of a device constructed according to the embodiment of my invention, showing the device in applied position on a nozzle attached to a hose.

Figure 2 is a sectional view taken on the line 2—2 of Figure 1.

Figure 3 is a detail side elevation of the device showing the manner in which it is used for sprinkling.

Referring to the drawing wherein like numerals of reference designate corresponding parts throughout the views, the numeral 10 designates generally a nozzle of conventional construction attached to a hose H connected to a suitable source of water supply. A tubular member 12 telescopes the nozzle 10 and projects forwardly of the nozzle 10 for a desired distance. This tubular member 12 is preferably constructed out of a section of hose or the like.

The tubular member 12 is provided at a point intermediate the ends thereof and preferably in substantially the longitudinal center with a plurality of elongated openings 13 which are preferably spaced forwardly from the forward end of the nozzle 10. A hollow member 14 preferably constructed of rubber or other yieldable material is secured to the hose section 12 in substantially the longitudinal center thereof and has a length greater than the length of the openings 13 and engages about the hose section 12 in a position to cover the openings 13.

The globular member 14 has its connections with the tubular member 12 sealed so as to prevent water from leaking out of the interior thereof and any water passing through the openings 13 may freely enter the interior of the globular member 14 and from the interior of this member 14 the water may again flow out of the openings 13 and then out of the forward end of the spray eliminator 12.

In the use of this device, one end of the spray eliminating member 12 is slipped over the nozzle 10 and the enlargement 14 when the hose 11 is placed flat on the ground will maintain the opposite end of the spray eliminating member 12 raised from the ground. When the water is turned on, the water will be sprayed from the nozzle 10 into the interior of the tubular member 12 and will strike the openings 13 and flow into the interior of the hollow member 14. When this member 14 has been filled up, the water will flow forwardly out of the openings 13 and then out of the forward end of the tubular member 12 in a solid stream of water rather than as a stream of water under pressure or as a spray. This stream of water will then flow onto the ground and the desired portions of the ground may be watered without having any holes dug into the ground by reason of the pressure at the end of the spray nozzle on account of the pressure of the water.

In some localities local regulations prohibit the watering of lawns or plants without the use of a spray nozzle and while this method of watering may be satisfactory for relatively large areas, where the area is relatively small or where the piece of ground to be watered is closely adjacent a building, the use of a spray is undesirable and where such spray is used, as for instance adjacent a building, the lower portion of the building will become wet and there is a tendency for the spray to injure the tender branches of plants. Furthermore, as most plants should be watered in a manner to prevent the water from contacting with the leaves and branches, the use of a spray is not desired, and as local regulations prevent removal of the nozzle, it is apparent that without a device such as has been heretofore described, the pressure of the spray will have a tendency to dig holes in the ground or otherwise cause damage to the building and the upper portions of the plants. With the use of this device, the water can be turned on substantially for the full pressure and the spray will be eliminated by reason of the water entering the bulb 14 and then flowing forwardly through the forward end of the tubular member 12.

What is claimed is:—

1. As a new article of manufacture, an attachment for a hose having a nozzle thereon comprising an elongated tubular member constructed of substantially flexible material, said member adapted to telescope said nozzle whereby to dispose the end of the nozzle at a point intermediate the ends of the tubular member, said tubular member having openings in the wall thereof forwardly of the end of the nozzle when disposed in the member, and a yieldable bulb secured to the member about said openings and adapted to receive and retain the spray from the nozzle whereby to condense the spray into a liquid.

2. As a new article of manufacture, a spray condensing means for spray nozzle comprising a tubular member adapted to removably telescope an end of the nozzle, said member having an opening in the wall thereof intermediate the ends and a hollow body secured to the member about the opening.

3. In combination, a liquid spray nozzle, and a spray condensing member removably telescoping a portion of the nozzle and projecting forwardly thereof, said member comprising a tubular body having an opening intermediate the ends thereof and a hollow body secured to the tubular body about the opening.

JOHN McDOWELL.
JAMES F. McDOWELL.
EARL McDOWELL.